(12) United States Patent
Bae

(10) Patent No.: US 11,519,060 B2
(45) Date of Patent: Dec. 6, 2022

(54) HOT-ROLLED STEEL SHEET WITH EXCELLENT LOW-TEMPERATURE TOUGHNESS, STEEL PIPE, AND MANUFACTURING METHOD THEREFOR

(71) Applicant: POSCO, Pohang-si (KR)

(72) Inventor: Jin-Ho Bae, Gwangyang-si (KR)

(73) Assignee: POSCO HOLDINGS INC., Seoul (KR)

(*) Notice: Subject to any disclaimer, the term of this patent is extended or adjusted under 35 U.S.C. 154(b) by 97 days.

(21) Appl. No.: 16/957,510

(22) PCT Filed: Oct. 4, 2018

(86) PCT No.: PCT/KR2018/011725
§ 371 (c)(1),
(2) Date: Jun. 24, 2020

(87) PCT Pub. No.: WO2019/132189
PCT Pub. Date: Jul. 4, 2019

(65) Prior Publication Data
US 2021/0054485 A1 Feb. 25, 2021

(30) Foreign Application Priority Data
Dec. 26, 2017 (KR) .................. 10-2017-0179259

(51) Int. Cl.
| | | |
|---|---|---|
| C22C 38/32 | (2006.01) | |
| B23K 11/00 | (2006.01) | |
| B23K 35/02 | (2006.01) | |
| B23K 35/30 | (2006.01) | |
| C21D 8/02 | (2006.01) | |
| C21D 8/10 | (2006.01) | |
| C21D 9/08 | (2006.01) | |
| C22C 38/00 | (2006.01) | |
| C22C 38/06 | (2006.01) | |
| C22C 38/20 | (2006.01) | |
| C22C 38/26 | (2006.01) | |
| C22C 38/28 | (2006.01) | |
| B23K 103/04 | (2006.01) | |

(52) U.S. Cl.
CPC ............ *C22C 38/32* (2013.01); *B23K 11/002* (2013.01); *B23K 35/0233* (2013.01); *B23K 35/3073* (2013.01); *C21D 8/0205* (2013.01); *C21D 8/0226* (2013.01); *C21D 8/105* (2013.01); *C21D 9/08* (2013.01); *C22C 38/001* (2013.01); *C22C 38/002* (2013.01); *C22C 38/06* (2013.01); *C22C 38/20* (2013.01); *C22C 38/26* (2013.01); *C22C 38/28* (2013.01); *B23K 2103/04* (2018.08); *C21D 2211/001* (2013.01)

(58) Field of Classification Search
None
See application file for complete search history.

(56) References Cited

U.S. PATENT DOCUMENTS

| | | |
|---|---|---|
| 2014/0251513 A1 | 9/2014 | Kami |
| 2015/0020928 A1 | 1/2015 | Lee et al. |
| 2017/0138511 A1 | 5/2017 | Lee et al. |
| 2017/0349982 A1 | 12/2017 | Kobayashi et al. |
| 2017/0349983 A1* | 12/2017 | Jin .................. C21D 8/0226 |
| 2017/0362675 A1 | 12/2017 | Lee et al. |
| 2018/0363108 A1 | 12/2018 | Lee et al. |

FOREIGN PATENT DOCUMENTS

| | | |
|---|---|---|
| CN | 104220617 A | 12/2014 |
| CN | 105683401 A | 6/2016 |
| CN | 105861941 A | 8/2016 |
| JP | 2006-299398 A | 11/2006 |
| JP | 2015-508452 A | 3/2015 |
| JP | 2016-196703 A | 11/2016 |
| JP | 2017-525841 A | 9/2017 |
| KR | 10-1994-0002370 A | 8/1994 |
| KR | 10-2011-0072791 A | 6/2011 |
| KR | 10-2012-0026249 A | 3/2012 |
| KR | 10-2014-0072180 A | 6/2014 |
| KR | 10-2015-0075305 A | 7/2015 |
| KR | 10-2017-0035563 A | 3/2017 |
| WO | 2016/052271 A1 | 4/2016 |
| WO | 2017/111510 A1 | 6/2017 |
| WO | 2017-148892 A1 | 8/2017 |

OTHER PUBLICATIONS

Japanese Office Action dated Oct. 5, 2021 issued in Japanese Patent Application No. 2020-535247.
Extended European Search Report dated Jan. 29, 2021 issued in European Patent Application No. 18894431.8.
Chinese Office Action dated Mar. 24, 2021 issued in Chinese Patent Application No. 201880084459.0.

* cited by examiner

*Primary Examiner* — Jenny R Wu
(74) *Attorney, Agent, or Firm* — Morgan, Lewis & Bockius LLP

(57) ABSTRACT

A preferable aspect of the present invention provides a hot-rolled steel sheet with excellent low-temperature toughness, a steel pipe using the same, and a manufacturing method therefor, wherein the hot-rolled steel sheet contains, by weight, 0.35-0.65% C, 0.01-0.4% Si, 13-26% Mn, 0.01-0.3% Ti, 0.01% or less B, 4% or less Al, 1-6% Cr, 0.05% or less P, 0.02% or less S, 0.01% or less N, 0.01-2% Cu, 0.001-0.015% Nb, and the balance Fe and other unavoidable impurities, the alloy elements satisfying the following relational formulas—[Relational formula 1] $70<[10*(C/12)+(Mn/55)+(Al/27)]*100<95$ and [Relational formula 2] $4<100*(Cr/52+100*(Nb/93))<9$; wherein a microstructure comprises, by area fraction, 97% or more (including 100%) of austenite and 3% or less (including 0%) of a carbide, the crystal grain size of the austenite being 18-30 μm or less; and wherein the size of the carbide is 0.5 μm or less.

8 Claims, No Drawings

HOT-ROLLED STEEL SHEET WITH EXCELLENT LOW-TEMPERATURE TOUGHNESS, STEEL PIPE, AND MANUFACTURING METHOD THEREFOR

CROSS-REFERENCE OF RELATED APPLICATIONS

This application is the U.S. National Phase under 35 U.S.C. § 371 of International Application No. PCT/KR2018/011725 filed on Oct. 4, 2018 which claims the benefit of Korean Patent Application No. 10-2017-0179259 filed Dec. 26, 2017. The entire disclosures of each are incorporated by reference herein.

TECHNICAL FIELD

The present disclosure relates to a hot-rolled steel plate having excellent low temperature toughness, used in the manufacturing of oil well pipe, or the like, a steel pipe and manufacturing methods therefor, more specifically to a hot-rolled steel plate and a steel pipe having excellent uniform elongation, low temperature impact toughness and expandability, a steel pipe using the same and manufacturing methods therefor.

BACKGROUND ART

Demand for API steel having high-strength, excellent low-temperature toughness and expandability is gradually increasing as depths of oil wells increase and mining environments become more extreme. In particular, steel pipes used for oil well pipes are required to have high strength, compressive strength for resisting for high internal and external pressure, high toughness, excellent delayed fracture resistance, and the like. In addition, as mining environments become more extreme, costs for oil well mining are rapidly increasing. In this regard, there has been demand for pipes having excellent expandability to reduce construction costs. As low-temperature toughness of pipes is deteriorated by plastic deformation when expanding, a hot-rolled steel plate having high impact energy is in demand to compensate therefor.

The excellent expandability is known to be obtained by high uniform elongation and a work hardening coefficient. Conventionally, seamless pipes are mainly used. A manufacturing method involves piercing a billet heated at a high temperature using a piercing mill, rolling the same using a rolling mill such as a plug mill, a mandrel mill, or the like, followed by processing a shaft diameter or a thickness using a reducer or a sizer and then quenching and tempering heat treating. However, such manufacturing methods may result in large variations in the thickness of the pipe and poor roundness. In this regard, oil major companies have been replacing seamless steel pipes with low-cost electric resistance welding steel pipes.

In the case of a welding pipe, deformation of 4% or more is applied in a circumferential direction and a longitudinal direction of the pipe during a pipe-making process. Due to such work hardening, yield strength may increase as well as a yield ratio. The work hardening increases as a ratio of the thickness and diameter of the steel pipe increases and as a secondary phases increase in a steel material. In addition, impact energy of the steel pipe is reduced due to processing defects, such as dislocations and microcracks integrated inside the steel pipe, during pipe making.

Further, existing carbon steel products may be disadvantageous, in that toughness significantly decreases as yield strength rapidly increases when a use temperature decreases, and thus have limitations in use. A method for manufacturing a material having high low-temperature toughness is to allow the material to have a stable austenite structure at room temperature and low temperatures. A ferrite structure shows a ductile-brittle transition at low temperatures and has toughness rapidly reduced in low-temperature brittle sections.

In contrast, an austenite structure has no ductile-brittle transition even at extremely low temperatures and has high low-temperature toughness. This is because, contrary to the ferrite, yield strength is low at low temperatures, and thus, plastic deformation is likely to occur, thereby absorbing impacts due to external deformation. A representative element, which increases austenite stability at low temperatures, is Ni, but may have a disadvantage of high price.

(Patent Document 1) Korean Laid-Open Patent Publication No. 2012-0026249

DISCLOSURE

Technical Problem

A preferable aspect of the present disclosure is to provide a hot-rolled steel plate having excellent uniform elongation, low-temperature impact toughness and expandability.

Another preferable aspect is to provide a method for manufacturing a hot-rolled steel plate having excellent uniform elongation, low-temperature impact toughness and expandability.

Still another preferable aspect is to provide a steel pipe having excellent uniform elongation, low-temperature impact toughness and expandability.

Still another preferable aspect is to provide a method for manufacturing a steel pipe having excellent uniform elongation, low-temperature impact toughness and expandability.

Technical Solution

According to a preferable aspect of the present disclosure, a hot-rolled steel plate having excellent low-temperature toughness includes, by weight %, 0.35% to 0.65% of C, 0.01 to 0.4% of Si, 13% to 26% of Mn, 0.01% to 0.3% of Ti, 0.01% or less (excluding 0%) of B, 4% or less (excluding 0%) of Al, 1% to 6% of Cr, 0.05% or less (including 0%) of P, 0.02% or less (including 0%) of S, 0.01% or less (excluding 0%) of N, 0.01% to 2% of Cu, 0.001% to 0.015% of Nb, and a remainder of Fe and other inevitable impurities, the alloy elements satisfying the following relational formula:

$$70 < [10*(C/12)+(Mn/55)+(Al/27)]*100 < 95 \quad \text{[Relational Formula 1]}$$

$$4 < 100*(Cr/52)+100*(Nb/93)) < 9, \quad \text{[Relational Formula 2]}$$

wherein a microstructure comprises, by area fraction, 97% or more (including 100%) of austenite and 3% or less (including 0%) of a carbide, the austenite having a grain size of 18 μm to 30 μm and the carbide having a size of 0.5 μm or less.

The number of inclusions having a 10 μm or greater may be 300 or less per 100×50 mm$^2$.

The hot-rolled steel plate may have an impact toughness value of 60 J or higher, measured by a charpy impact test at −196° C., yield strength of 320 MPa at a room temperature and uniform elongation of 50% or more at a room temperature.

The hot-rolled steel plate may include the austenite, as the microstructure, in a fraction of 97 area % or more (including 1000) at −196° C.

According to another preferable aspect, a method for manufacturing a hot-rolled steel plate having excellent low-temperature toughness may include preparing a steel slab comprising, by weight %, 0.35% to 0.65% of C, 0.01 to 0.4% of Si, 13% to 26% of Mn, 0.01% to 0.3% of Ti, 0.01% or less (excluding 0%) of B, 4% or less (excluding 0%) of Al, 1% to 6% of Cr, 0.05% or less (including 0%) of P, 0.02% or less (including 0%) of S, 0.01% or less (excluding 0%) of N, 0.01% to 2% of Cu, 0.001% to 0.015% of Nb, and a remainder of Fe and other inevitable impurities, the alloy elements satisfying the following relational formula:

$$70<[10*(C/12)+(Mn/55)+(Al/27)]*100<95 \quad \text{[Relational Formula 1]}$$

$$4<100*(Cr/52+100*(Nb/93))<9, \quad \text{[Relational Formula 2]}$$

heating the steel slab at a temperature of 1000° C. to 1250° C.;

obtaining a hot-rolled steel plate by first hot rolling under conditions of a finish rolling temperature of 950° C. to 1050° C. and a reduction ratio of 10% or more per pass in recrystallization region and second hot rolling under conditions of a finish rolling temperature of 850° C. to 1000° C. and a reduction ratio of 2% or less (including 0%) per non-recrystallization region; and water cooling the hot-rolled steel plate at a cooling rate of 5° C./s or more to a cooling temperature of 250° C. to 600° C. and then coiling.

According to another preferable aspect, a steel pipe having excellent low-temperature toughness includes, by weight %, 0.35% to 0.65% of C, 0.01 to 0.4% of Si, 13% to 26% of Mn, 0.01% to 0.3% of Ti, 0.01% or less (excluding 0%) of B, 4% or less (excluding 0%) of Al, 1% to 6% of Cr, 0.05% or less (including 0%) of P, 0.02% or less (including 0%) of S, 0.01% or less (excluding 0%) of N, 0.01% to 2% of Cu, 0.001% to 0.015% of Nb, and a remainder of Fe and other inevitable impurities, the alloy elements satisfying the following relational formula:

$$70<[10*(C/12)+(Mn/55)+(Al/27)]*100<95 \quad \text{[Relational Formula 1]}$$

$$4<100*(Cr/52+100*(Nb/93))<9, \quad \text{[Relational Formula 2]}$$

wherein a microstructure comprises, by area fraction, 97% or more (including 100%) of austenite and 3% or less (including 0%) of a carbide, the austenite having a grain size of 18 μm to 30 μm and the carbide having a size of 0.5 μm or less, and wherein flaring pipe expansion amount is 30% or more.

According to another preferable aspect, a method of manufacturing a steel pipe having excellent low-temperature toughness includes preparing a hot-rolled steel plate comprising, by weight %, 0.35% to 0.65% of C, 0.01 to 0.4% of Si, 13% to 26% of Mn, 0.01% to 0.3% of Ti, 0.01% or less (excluding 0%) of B, 4% or less (excluding 0%) of Al, 1% to 6% of Cr, 0.05% or less (including 0%) of P, 0.02% or less (including 0%) of S, 0.01% or less (excluding 0%) of N, 0.01% to 2% of Cu, 0.001% to 0.015% of Nb, and a remainder of Fe and other inevitable impurities, the alloy elements satisfying the following relational formula:

$$70<[10*(C/12)+(Mn/55)+(Al/27)]*100<95 \quad \text{[Relational Formula 1]}$$

$$4<100*(Cr/52+100*(Nb/93))<9, \quad \text{[Relational Formula 2]}$$

wherein a microstructure comprises, by area fraction, 97% or more (including 100%) of austenite and 3% or less (including 0%) of a carbide, and the austenite having a grain size of 18 μm to 30 μm;

making the hot-rolled steel plate into a pipe to obtain a steel pipe; and heat treating the steel pipe at a temperature of 800° C. or more for 10 minutes or more.

A heat treatment temperature of the steel pipe may be 800° C. to 1000° C.

In the pipe making, electric resistance welding may be employed.

The electric resistance welding may be performed in a non-oxidizing atmosphere.

The non-oxidizing atmosphere is obtained by sealing a welding space and dispersing argon gas therein.

Advantageous Effects

According to a preferable aspect of the present disclosure, a hot-rolled steel plate having excellent uniform elongation, low temperature impact toughness and expandability and a steel pipe using the same may be provided.

The steel pipe according to a preferable aspect may be effectively applied to oil and gas mining.

BEST MODE

The present disclosure is to provide a hot-rolled steel plate having excellent low-temperature impact toughness by improving stability of austenite by adding C, Mn, Al, and the like, and excellent expandability after pipe making due to high elongation at room temperature, a steel pipe using the same, and manufacturing methods therefor.

The present disclosure is to provide a hot-rolled steel plate having excellent low-temperature impact toughness and high uniform elongation and a manufacturing method therefor, a steel pipe having excellent pipe expandability and a manufacturing method therefor, by precisely controlling components and a structure as well as manufacturing conditions of the steel plate and the steel pipe to secure excellent expandability after pipe making oil well pipes.

In addition, the present disclosure is to provide a steel pipe and a manufacturing method therefor, the steel pipe capable of securing excellent expandability by suppressing an oxide generated in a welding line when expanding a steel pipe through electric resistance welding or the like thereby preventing failure to a weld zone.

Hereinafter, the hot-rolled steel plate having excellent low-temperature toughness according to a preferable aspect of the present disclosure will be described.

A hot-rolled steel plate having excellent low-temperature toughness according to a preferable aspect includes, by weight %, 0.35% to 0.65% of C, 0.01 to 0.4% of Si, 13% to 26% of Mn, 0.01% to 0.3% of Ti, 0.01% or less of B, 4% or less of Al, 1% to 6% of Cr, 0.05% or less of P, 0.02% or less of S, 0.01% or less of N, 0.01% to 2% of Cu, 0.001% to 0.015% of Nb, and a remainder of Fe and other inevitable impurities, the alloy elements satisfying the following relational formula:

$$70<[10*(C/12)+(Mn/55)+(Al/27)]*100<95 \quad \text{[Relational Formula 1]}$$

$$4<100*(Cr/52+100*(Nb/93))<9, \quad \text{[Relational Formula 2]}$$

Carbon (C): 0.35 wt % to 0.65 wt % (hereinafter, referred to as "%")

C is an element which may be required to stabilize austenite in steel and to secure strength by being solute to steel. When a content of C is less than 0.35%, austenite stability may be insufficient, such that ferrite or martensite may be formed, which may degrade low temperature toughness. When a content of C exceeds 0.65%, carbide may be formed such that a surface defect may occur, and toughness may degrade. Accordingly, it may be preferable to control the content of C to be 0.35% to 0.65%.

Silicon (Si): 0.01% to 0.4%

Si contributes to securing strength by solid solution strengthening. In addition, Si forms a low-melting-point oxide, such as $Mn_2SiO_4$, during ERW welding and allows the oxide to be easily discharged during welding. When a content thereof is less than 0.01%, the solid solution strengthening effect is insignificant, whereas when it exceeds 0.4%, an amount of formation of $SiO_2$ oxide having a high melting point in addition to $Mn_2SiO_4$ increases, and toughness of the weld zone may be reduced during electric resistance welding. Therefore, the Si content is preferably limited to 0.01% to 0.4%.

Manganese (Mn): 13% to 26%

Mn is an element stabilizing an austenite structure. To secure low-temperature toughness, formation of ferrite should be prevented and austenite stability may need to be increased. In this regard, a minimum content of Mn maybe 20% or higher in the present disclosure. When a content of Mn is less than 13%, a martensite phase may be formed, which may reduce low-temperature toughness. In contrast, when a content of Mn exceeds 25%, manufacturing costs may greatly increase, and internal oxidation may excessively occur during heating in a hot-rolling process, thereby leading to a problem of degradation of surface quality. Accordingly, it may be preferable to control a content of Mn to be 13% to 26%.

Titanium (Ti): 0.01% to 0.3%

Ti is an element forming a TiN precipitate in combination with nitrogen (N). In the present disclosure, during high-temperature hot rolling, a portion of the austenite grain may be significantly coarse. In this regard, growth of the austenite grain may be suppressed by properly precipitating TiN. To this end, at least 0.01% or more of Ti should be added. However, when a Ti content is higher than 0.3%, the effect may be saturated and coarse TiN may be educed, thereby deteriorating the effect. Accordingly, in the present invention, the Ti content may be limited to be 0.01% to 0.3%.

Boron (B): 0.01% or Less (Excluding 0%)

B is an element that is preferentially segregated in an austenite grain boundary to lower energy of the grain boundary to increase stability. In general, the austenite grain boundary has very high energy, and thus may have significantly low stability, and particularly, it acts as a formation of carbonitrides. In the case of an austenite steel material containing large amounts of carbon and nitrogen, carbides are easily formed at a low cooling rate, thereby rapidly deteriorating elongation and low-temperature toughness. Boron is known as an element which is preferentially segregated in an austenite grain boundary, and as a result, grain boundary energy is lowered and stabilized, thereby preventing nucleation and growth of other carbonitrides. In contrast, when an amount exceeds 0.01%, the effect depending on the amount no longer increases, and coarse boron nitrides are precipitated in the grain. Accordingly, it is preferable to limit an upper limit of boron to 0.01%.

Aluminum (Al): 4% or Less (Excluding 0%)

Al has an effect of, by increasing stacking fault energy, enabling plastic deformation by facilitating movement of dislocations at low temperatures. When a content of Al exceeds 4%, manufacturing costs may greatly increase, and cracking may occur in a consecutive casting process, thereby leading to a problem of degradation of surface quality. In this regard, it may be preferable to control the content of Al to be 4% or less (excluding 0%).

Chromium (Cr): 1% to 6%

Cr in an appropriate content range may stabilize austenite, thus improving low-temperature impact toughness and increasing strength of a steel material while being solute in austenite. Cr is also an element which may improve corrosion resistance of a steel material. As a carbide-forming element, however, Cr may form carbides at an austenite grain boundary and may decrease low-temperature impact properties. In this regard, it may be preferable to determine a content of Cr added in the present disclosure in consideration of relations with C and other elements to be added together. An amount of less than 1% may result in an insufficient austenite-stabilizing effect, whereas when a content of Cr exceeds 6%, it may be difficult to effectively suppress formation of carbides in an austenite grain boundary, thereby reducing low-temperature impact toughness. Accordingly, it is preferable to control the content of Cr to be 1% to 6%.

Phosphorous (P): 0.05% or Less (Including 0%)

P is an element which may be inevitably added when manufacturing steel. When P is added, P may be segregated in a central portion of a steel plate and may be used as a crack initiation point or a crack growth path. It may be theoretically preferable to control a content of P to be 0%; however, in terms of manufacturing process, P may be inevitably included as impurities. Accordingly, it is important to control an upper limit thereof. In the present disclosure, it may be preferable to control an upper limit content of P to be 0.05%.

Sulfur (S): 0.02% or Less (Including 0%)

S is an impurity element present in steel. S may be combined with Mn, and the like, to form a non-metal inclusion, which may degrade toughness of steel. In this regard, it may be preferable to decrease a content of S as possible, and thus, an upper limit content thereof is 0.02%.

Nitrogen (N): 0.01% or Less (Excluding 0%)

In general, N is solute in steel and then precipitated to increase strength of the steel, and such characteristics are much stronger than those of carbon. Meanwhile, it is known that the more that nitrogen is present in the steel, the more the toughness decreases. In this regard, it is a general trend that an amount of N contained in steel is maintained to be as low as possible. In the present disclosure, however, an appropriate amount of N is present to react with Ti to form TiN, thereby endowing a role of inhibiting grain growth during reheating. However, it is preferable to limit an upper limit to 0.01% as a portion of Ti does not react with N and remains to react with carbon in a subsequent process.

Copper (Cu): 0.01% to 2%

Cu maybe required to increase strength by being solute in steel. When a content of Cu is less than 0.01%, it may be difficult to obtain an effect upon addition of Cu. When a content of Cu exceeds 2%, cracking may easily occur on a slab. Accordingly, it is preferable to control a content of Cu to be 0.01% to 2%.

Niobium (Nb): 0.001% to 0.015%

Nb is a significantly useful element for suppressing recrystallization during rolling to refine crystal grains. In the meantime, at least 0.001% or more of Nb should be added because it serves to improve strength of steel; however, when an amount thereof exceeds 0.015%, an excessive amount of Nb carbonitrides are precipitated, which may be harmful to toughness of the steel material. Accordingly, the Nb amount is limited to 0.001% to 0.015%.

The C, Mn and Al should satisfy Relational Formula 1 below:

$$70<[10*(C/12)+(Mn/55)+(Al/27)]*100<95 \quad \text{[Relational Formula 1]}$$

Relational Formula 1 above is for stability of austenite at room temperature and lower temperatures. When a value of Relational Formula 1 is 70 or less, stability of austenite is reduced, and martensite may be formed at the time of deformation at room temperature and lower temperatures, thereby deteriorating impact toughness and pipe expandability. When a value of Relational Formula 1 is 95 or above, coarse carbides or oxidative inclusions are formed, thereby deteriorating impact toughness and pipe expandability.

Meanwhile, Cr and Nb should satisfy Relational Formula 2 below:

$$4<100*(Cr/52+100*(Nb/93))<9, \quad \text{[Relational Formula 2]}$$

Relational Formula 2 is for strengthening solid solution and precipitation of a steel material. Cr and Nb exhibit a solid solution strengthening effect and improve strength of a steel material by forming fine carbides. When a value of Relational Formula 2 is less than 4, such effect is insignificant whereas when that is 9 or above, coarse carbides are formed, thereby deteriorating toughness and expandability.

According to a preferable aspect, a hot-rolled steel plate having excellent low-temperature toughness includes a microstructure including, by area fraction, 97% or more (including 100%) of austenite and 3% or less (including 0%) of a carbide, where the austenite has a grain size of 18 μm to 30 μm and the carbide has a size of 0.5 μm or less.

As a size of an austenite crystal grain increases, pipe expansion amount increases. However, when the austenite grain extremely increases in size, impact characteristics are deteriorated, while when the austenite crystal grain is extremely reduced, amount of pipe expansion is reduced. Accordingly, it is preferable to maintain the size of the crystal grain to be 18 μm to 30 μm.

When an amount of the carbides exceeds 3%, a possibility of cracking occurrence increases during pipe making. In this regard, formation of carbides should be minimized.

The number of an inclusion having a 10 μm or greater may be 300 or less per 100×50 mm².

The hot-rolled steel plate may have an impact toughness value of 60 J or higher, measured by a charpy impact test at −196° C., yield strength of 320 MPa at a room temperature and uniform elongation of 50% or more at a room temperature.

The hot-rolled steel plate may include austenite, as the microstructure, in a fraction of 97 area % or more (including 1000) at −196° C.

Hereinafter, a method for manufacturing a hot-rolled steel plate having excellent low-temperature toughness according to another preferable aspect of the present disclosure will be described.

According to another preferable aspect, a method of manufacturing a hot-rolled steel plate having low-temperature toughness includes preparing a steel slab comprising, by weight %, 0.35% to 0.65% of C, 0.01 to 0.4% of Si, 13% to 26% of Mn, 0.01% to 0.3% of Ti, 0.01% or less (excluding 0%) of B, 4% or less (excluding 0%) of Al, 1% to 6% of Cr, 0.05% or less (including 0%) of P, 0.02% or less (including 0%) of S, 0.01% or less (excluding 0%) of N, 0.01% to 2% of Cu, 0.001% to 0.015% of Nb, and a remainder of Fe and other inevitable impurities, the alloy elements satisfying the following relational formula:

$$70<[10*(C/12)+(Mn/55)+(Al/27)]*100<95 \quad \text{[Relational Formula 1]}$$

$$4<100*(Cr/52+100*(Nb/93))<9, \quad \text{[Relational Formula 2]}$$

heating the steel slab at a temperature of 1000° C. to 1250° C.; obtaining a hot-rolled steel plate by first hot rolling under conditions of a finish rolling temperature of 950° C. to 1050° C. and a reduction ratio of 10% or more per pass in recrystallization region and second hot rolling under conditions of a finish rolling temperature of 850° C. to 1000° C. and a reduction ratio of 2% or less (including 0%) per non-recrystallization region; and water cooling the hot-rolled steel plate at a cooling rate of 5° C./s or more to a cooling temperature of 250° C. to 600° C. and then coiling.

Slab Heating

A steel slab prepared as the above is heated at a temperature of 1000° C. to 1250° C.

The slab heating process is a process of heating a slab for a smooth subsequent rolling process and sufficiently securing desired properties of the steel plate. In this regard, the heating process should be performed within an appropriate temperature range according to a purpose.

During slab heating, heating should be performed uniformly such that precipitation-type elements inside the steel plate are sufficiently solubilized, and formation of coarse grains due to an extremely high heating temperature should be prevented. A heating temperature of the steel slab is preferably 1000° C. to 1250° C., which is for solubilization and homogenization of casting structure, segregation and secondary phases generated in the slab preparation process. When the temperature is below 1000° C., homogenization may be insufficient or a heating temperature may be so low that deformation resistance may increases when hot rolling. When the temperature exceeds 1250° C., surface quality may deteriorate. Accordingly, it is preferable that the slab heating temperature be set to be in the range of 1000° C. to 1250° C.

In addition, it is preferable that the number of inclusions having a 10 μm or greater be reduced to 300 or less per 100×50 mm² when manufacturing the slab. The inclusions having a 10 μm or greater may play as a factor that initiates cracking when pipe expanding, and thus, a number thereof is preferably limited.

Obtaining Hot-Rolled Steel Plate

The steel slab heated as the above is subject to first hot rolling under conditions of a finish rolling temperature of 950° C. to 1050° C. and a reduction ratio of 10% or more per pass in recrystallization region and then second hot rolling under conditions of a finish rolling temperature of 850° C. to 1000° C. and a reduction ratio of 2% or less (including 0%) per non-recrystallization region.

That is, it is important that the first rolling of the heated slab be finished at 950° C. to 1050° C., and the second rolling be performed in a non-recrystallization region under a reduction ratio of 2% or less (including 0%) and finished at 850° C. to 1000° C. Crystal grains can be effectively refined only when the hot rolling is performed in said temperature range. In particular, a significantly high finish rolling temperature may lead a final structure to be coarse, thus failing to obtain desired strength, whereas a significantly low temperature may result in a problem of finish rolling equipment load. Further, when a reduction amount in the non-recrystallization is too large, impact toughness may be reduced; accordingly, a reduction ratio is preferably 2% or less (including 0%).

Cooling of Hot-Rolled Steel Plate and Coiling

The hot-rolled steel plate is water cooled at a cooling rate of 5° C./s or more to a cooling temperature of 250° C. to 600° C. and then coiled.

When the cooling temperature is above 600° C., surface quality may deteriorate, and coarse carbides are formed, thereby reducing toughness. In addition, a temperature below 250° C. may require a large amount of cooling water to coil, thereby greatly increasing coiling load.

By a method for manufacturing a hot-rolled steel plate having excellent low-temperature toughness according to another preferable aspect, a hot-rolled steel plate having 97 area % or more (including 100%) of austenite and 3 area % or less (including 0%) of a carbide, wherein the austenite has a grain size of 18 μm to 30 μm and the carbide has a grain size of 0.5 μm or less, having an impact toughness value of 60 J or higher, measured by a charpy impact test at −196° C., yield strength of 320 MPa at a room temperature and uniform elongation of 50% or more at a room temperature may be manufactured.

The hot-rolled steel plate has inclusions that the number of inclusions having a 10 μm or greater may be 300 or less per 100×50 mm².

The hot-rolled steel plate may include the austenite in a fraction of 97 area % or more (including 100%) at −196° C.

A steel pipe according to another preferable aspect and a manufacturing method therefor will be described.

A steel pipe according to another preferable aspect may include, by weight %, 0.35% to 0.65% of C, 0.01 to 0.4% of Si, 13% to 26% of Mn, 0.01% to 0.3% of Ti, 0.01% or less (excluding 0%) of B, 4% or less (excluding 0%) of Al, 1% to 6% of Cr, 0.05% or less (including 0%) of P, 0.02% or less (including 0%) of S, 0.01% or less (excluding 0%) of N, 0.01% to 2% of Cu, 0.001% to 0.015% of Nb, and a remainder of Fe and other inevitable impurities, the alloy elements satisfying the following relational formula:

$$70<[10*(C/12)+(Mn/55)+(Al/27)]*100<95 \quad [\text{Relational Formula 1}]$$

$$4<100*(Cr/52+100*(Nb/93))<9, \quad [\text{Relational Formula 2}]$$

The steel pipe according to another preferable aspect has a microstructure including, by area fraction, 97% or more (including 100%) of austenite and 3% or less (including 0%) of a carbide, the austenite having a grain size of 18 μm to 30 μm and the carbide having a size of 0.5 μm or less, and wherein flaring pipe expansion amount is 30% or more.

According to another preferable aspect, a method of manufacturing a steel pipe includes preparing a hot-rolled steel plate comprising, by weight %, 0.35% to 0.65% of C, 0.01 to 0.4% of Si, 13% to 26% of Mn, 0.01% to 0.3% of Ti, 0.01% or less (excluding 0%) of B, 4% or less (excluding 0%) of Al, 1% to 6% of Cr, 0.05% or less (including 0%) of P, 0.02% or less (including 0%) of S, 0.01% or less (excluding 0%) of N, 0.01% to 2% of Cu, 0.001% to 0.015% of Nb, and a remainder of Fe and other inevitable impurities, the alloy elements satisfying the following relational formula:

$$70<[10*(C/12)+(Mn/55)+(Al/27)]*100<95 \quad [\text{Relational Formula 1}]$$

$$4<100*(Cr/52+100*(Nb/93))<9, \quad [\text{Relational Formula 2}]$$

wherein a microstructure comprises, by area fraction, 97% or more (including 100%) of austenite and 3% or less (including 0%) of a carbide, and the austenite having a grain size of 18 μm to 30 μm;

making the hot-rolled steel plate into a pipe to obtain a steel pipe; and heat treating the steel pipe at a temperature of 800° C. or more for 10 minutes or more.

Pipe Making of Hot-Rolled Steel Plate

The hot-rolled steel plate is formed into a pipe to obtain a steel pipe. The steel pipe may be used in oil well pipes.

In the pipe making, electric resistance welding may be employed.

The electric resistance welding may be performed in a non-oxidizing atmosphere.

The non-oxidizing atmosphere may be obtained by sealing a welding space and dispersing argon gas therein.

For example, in the case of the electric resistance welding, high frequency induction heating method has excellent productivity but may have insufficient defect control of weld zones. In particular, in the case of a material containing large amounts of Mn and Al, it is preferable that a welding method involving sealing a welding space to minimize occurrence of oxides of Mn and Al and dispersing argon gas therein to form a non-oxidizing atmosphere be applied to form a pipe while lowering an oxygen concentration.

Heat Treatment of Steel Pipe

The steel formed as the above is subject to heat treatment for 3 minutes or more at a temperature of 800° C. or more.

A preferable temperature for the heat treatment is 800° C. to 1000° C.

During the welding in the pipe making, the heat treatment is performed to improve expandability by reducing differences of a base material and a welding zone in structures and hardness.

It is preferable that the heat treatment be performed at a temperature of 800° C. or above for 3 minutes or more such that the hardness and structure of the base material and the welding zone are uniform.

When the heat treatment temperature is above 1000° C., a structure becomes coarse thereby strength is reduced. When the heat treatment is performed at a temperature of 800° C. or above for less than 3 minutes, it may be difficult to resolve remaining stress formed during the pipe making and to remove a hardness deviation of the welding zone. In this regard, it is necessary that the heat treatment be performed for at least 3 minutes, preferably 10 minutes or more.

MODE FOR INVENTION

In the description below, the present disclosure will be described in more detail with reference to example embodiments. The example embodiments, however, are merely for describing the present invention in detail and thus should not limit the scope of the present disclosure.

A steel satisfying components and component ranges and relational formulae thereof indicated in Tables 1 and 2 below is manufactured by a continuous casting method and hot-rolled under hot rolling conditions of Table 3 below to have a thickness of 8 mm.

A grain size, a fraction and a size of a carbide, room temperature yield strength, uniform elongation, coil impact energy (J, @−196° C.) and martensite production (%) during −196° C. charpy impact test were measured for the hot-rolled steel plate and results are shown in Table 4 below.

A phase other than carbide in the microstructure of the hot-rolled steel plate is an austenite phase.

The hot-rolled steel plate was used to manufacture a 4 to 11 inch electric resistance welding steel pipe under conditions of Table 5 below. A welding zone is sealed by being surrounded by a box and being injected with argon gas. A heat treatment time for the steel pipe was 11 minutes to 16 minutes.

Expansion amount of thus-manufactured steel pipe was measured and shown in Table 5 below. The expansion amount of the steel pipe is measured by a flaring test based on ASTM A513.

TABLE 1

|  | Steel | C | Si | Mn | Al | P | S | Cr | Ti | B | N | Cu | Nb |
|---|---|---|---|---|---|---|---|---|---|---|---|---|---|
| Inventive Materials | A1 | 0.65 | 0.2 | 16 | 1.5 | 0.035 | 0.008 | 2.5 | 0.015 | 0.0005 | 0.007 | 0.25 | 0.01 |
|  | A2 | 0.44 | 0.1 | 24 | 0.04 | 0.027 | 0.009 | 3.4 | 0.012 | 0.001 | 0.009 | 0.5 | 0.015 |
|  | A3 | 0.55 | 0.15 | 20 | 0.5 | 0.02 | 0.007 | 1.5 | 0.011 | 0.0015 | 0.006 | 0.7 | 0.011 |
|  | A4 | 0.58 | 0.23 | 18 | 0.8 | 0.02 | 0.008 | 2.2 | 0.013 | 0.002 | 0.006 | 0.3 | 0.013 |
|  | A5 | 0.36 | 0.15 | 22 | 0.1 | 0.03 | 0.006 | 3 | 0.018 | 0.0025 | 0.004 | 0.45 | 0.008 |
| Comparative Materials | B1 | 0.38 | 0.2 | 13 | 0.3 | 0.03 | 0.006 | 0.1 | 0.012 | 0.001 | 0.003 | 0.2 | 0.008 |
|  | B2 | 0.41 | 0.2 | 12 | 0.1 | 0.04 | 0.008 | 2 | 0.013 | 0.0008 | 0.008 | 0.1 | 0.003 |
|  | B3 | 0.35 | 0.4 | 8 | 2 | 0.06 | 0.009 | 0.2 | 0.011 | 0.001 | 0.006 | 0 | 0 |
|  | B4 | 0.3 | 0.3 | 13 | 1 | 0.035 | 0.006 | 0.1 | 0.012 | 0.0015 | 0.005 | 0.4 | 0.01 |
|  | B5 | 0.45 | 0.2 | 28 | 1 | 0.02 | 0.007 | 2.8 | 0.018 | 0.002 | 0.009 | 0.25 | 0.04 |

TABLE 2

|  | Steel | (10*C/12 + Mn/55 + 2*Al/27)*100 | 100* (Cr/52 + 100* (Nb/93)) | Inclusions having a 10 μm or greater (number/100*50 mm$^2$) |
|---|---|---|---|---|
| Inventive Materials | A1 | 94 | 5.9 | 291 |
|  | A2 | 81 | 8.2 | 283 |
|  | A3 | 86 | 4.1 | 274 |
|  | A4 | 87 | 5.6 | 293 |
|  | A5 | 71 | 6.6 | 266 |
| Comparative Materials | B1 | 58 | 1.1 | 351 |
|  | B2 | 57 | 4.2 | 402 |
|  | B3 | 59 | 0.4 | 387 |
|  | B4 | 56 | 1.3 | 412 |
|  | B5 | 96 | 9.7 | 392 |

TABLE 3

| Samples |  | Steel | Slab Heating Temperature (° C.) | First finish rolling temp (° C.) | Second finish rolling temp (° C.) | Non-crystallization region reduction (%) | Coiling temperature (° C.) |
|---|---|---|---|---|---|---|---|
| Inventive Materials | 1 | A1 | 1168 | 1008 | 937 | 0 | 447 |
|  | 2 | A2 | 1172 | 1023 | 890 | 1 | 469 |
|  | 3 | A3 | 1178 | 1013 | 924 | 0 | 471 |
|  | 4 | A4 | 1174 | 1030 | 936 | 2 | 380 |
|  | 5 | A5 | 1172 | 1001 | 917 | 0 | 480 |
| Comparative Materials | 6 | B1 | 1221 | 1001 | 924 | 0 | 381 |
|  | 7 | B2 | 1187 | 1012 | 882 | 2 | 336 |
|  | 8 | B3 | 1097 | 1025 | 841 | 3 | 424 |
|  | 9 | B4 | 1206 | 1009 | 953 | 0 | 700 |
|  | 10 | B5 | 1212 | 1019 | 927 | 0 | 650 |
|  | 11 | A1 | 1099 | 1022 | 910 | 0 | 431 |
|  | 12 | A3 | 1105 | 1014 | 843 | 4 | 429 |
|  | 13 | A2 | 1094 | 1011 | 930 | 1 | 470 |

TABLE 4

| Samples |  | Steel | Grain size (μm) | Carbide (%) | Carbide size (μm) | RT yield strength (MPa) | Uniform elongation (%) | Impact energy (J, @−196° C.) | −196° C. impact test martensite production (%) |
|---|---|---|---|---|---|---|---|---|---|
| Inventive Materials | 1 | A1 | 24 | 0.8 | 0.4 | 389 | 66 | 75 | 0 |
|  | 2 | A2 | 21 | 0.5 | 0.3 | 425 | 67 | 88 | 0 |
|  | 3 | A3 | 23 | 0.2 | 0.2 | 411 | 61 | 85 | 0 |
|  | 4 | A4 | 26 | 0.2 | 0.1 | 382 | 66 | 81 | 0 |
|  | 5 | A5 | 25 | 0.1 | 0.2 | 394 | 62 | 79 | 0 |
| Comparative Materials | 6 | B1 | 29 | 0.1 | 0.2 | 342 | 45 | 35 | 0 |
|  | 7 | B2 | 26 | 0.1 | 0.1 | 433 | 42 | 32 | 31 |
|  | 8 | B3 | 22 | 0.2 | 0.2 | 425 | 46 | 31 | 32 |
|  | 9 | B4 | 33 | 5 | 3 | 325 | 35 | 13 | 29 |

TABLE 4-continued

| Samples | Steel | Grain size (μm) | Carbide (%) | Carbide size (μm) | RT yield strength (MPa) | Uniform elongation (%) | Impact energy (J, @-196° C.) | -196° C. impact test martensite production (%) |
|---|---|---|---|---|---|---|---|---|
| 10 | B5 | 27 | 3 | 2 | 417 | 41 | 25 | 34 |
| 11 | A1 | 30 | 0.2 | 0.1 | 394 | 59 | 44 | 0 |
| 12 | A3 | 24 | 0.3 | 0.2 | 452 | 60 | 72 | 0 |
| 13 | A2 | 29 | 0.4 | 0.3 | 422 | 56 | 73 | 0 |

TABLE 5

| | Samples | Steel | Welding zone sealing | Steel pipe heat treatment | Heat treatment temp (° C.) | Heat treatment time (min) | Pipe expansion amount (%) |
|---|---|---|---|---|---|---|---|
| Inventive Materials | 1 | A1 | P | P | 820 | 14 | 43 |
| | 2 | A2 | P | P | 850 | 12 | 42 |
| | 3 | A3 | P | P | 842 | 12 | 41 |
| | 4 | A4 | P | P | 835 | 11 | 45 |
| | 5 | A5 | P | P | 840 | 11 | 47 |
| Comparative Materials | 6 | B1 | P | P | 845 | 11 | 21 |
| | 7 | B2 | P | P | 435 | 15 | 17 |
| | 8 | B3 | NP | NP | 0 | — | 15 |
| | 9 | B4 | NP | NP | 0 | — | 5 |
| | 10 | B5 | NP | NP | 0 | — | 8 |
| | 11 | A1 | P | P | 510 | 16 | 25 |
| | 12 | A3 | P | P | 798 | 14 | 28 |
| | 13 | A2 | NP | NP | 0 | — | 21 |

*P: Performed,
**NP: Not Performed

As shown in Tables 1 to 5, the inventive materials (1-5) are shown to have at least 380 MPa of yield strength, at least 60% uniform elongation and an impact energy value of 60 J or higher at −196° C. Further, it is shown that no martensite is formed during an impact test at −196° C.

In the case in which the inventive materials (1 to 5) are used to manufacture a steel pipe according to the present disclosure, a pipe expansion ratio of 40% or more is exhibited.

Meanwhile, the comparative materials (6 to 13), beyond the scope of the present disclosure, are exhibited to have deteriorated properties of the hot-rolled steel plate and steel pipe, as compared to the inventive materials (1 to 5). Specifically, the comparative materials (6 to 13), beyond the scope of Relational Formula 1, are exhibited to form martensite. Further, in the case of Comparative Materials 9 and 10, the coiling temperature was as high as 600° C. or more, resulting in formation of carbides having a 0.5 μm or more.

In addition, in the case of Comparative Materials 11 to 13, heat treatment is not performed even when A1 to A3, satisfying the requirements of the present disclosure, are used, and a pipe expansion ratio of 30% or less is exhibited when the pipe heat treatment temperature is less than 800° C.

As the above, when a hot-rolled steel plate is manufactured according to the components, the ranges and relational formulae thereof, and manufacturing conditions, which fall within the scope of the present disclosure, not only a steel plate having high strength, high toughness and high uniform elongation can be manufactured but also a steel pipe having excellent expandability can be manufactured according to the present disclosure using the hot-rolled steel plate.

While the present disclosure has been shown and described in connection with the exemplary embodiments, it will be apparent to those skilled in the art that modifications and variations can be made without departing from the spirit and scope of the invention as defined by the appended claims.

The invention claimed is:

1. A hot-rolled steel plate, comprising:
by weight %, 0.35% to 0.65% of C, 0.01 to 0.4% of Si, 13% to 26% of Mn, 0.01% to 0.3% of Ti, 0.01% or less, excluding 0% of B, 4% or less, excluding 0% of Al, 1% to 6% of Cr, 0.05% or less, including 0% of P, 0.02% or less, including 0% of S, 0.01% or less, excluding 0% of N, 0.01% to 2% of Cu, 0.001% to 0.015% of Nb, and a remainder of Fe and other inevitable impurities, the alloy elements satisfying the following relational formula:

$$70<[10*(C/12)+(Mn/55)+(Al/27)]*100<95 \quad [\text{Relational Formula 1}]$$

$$4<100*(Cr/52+100*(Nb/93))<9, \quad [\text{Relational Formula 2}]$$

wherein a microstructure comprises, by area fraction, 97% or more, including 100% of austenite and 3% or less, including 0% of a carbide, the austenite having a grain size of 18 μm to 30 μm and the carbide having a size of 0.5 μm or less, and
wherein the hot-rolled steel plate has inclusions and the number of inclusions having a 10 μm or greater is 300 or less per 100×50 mm².

2. The hot-rolled steel plate of claim 1, wherein the hot-rolled steel plate has an impact toughness value of 60 J or higher, measured by a charpy impact test at −196° C., yield strength of 320 MPa or more at a room temperature and uniform elongation of 50% or more at a room temperature.

3. The hot-rolled steel plate of claim 1, wherein the hot-rolled steel plate comprises the austenite, as the microstructure, in a fraction of 97 area % or more, including 100% at −196° C.

4. A method of manufacturing the hot-rolled steel plate according to claim 1, the method comprising:
preparing a steel slab comprising, by weight %, 0.35% to 0.65% of C, 0.01 to 0.4% of Si, 13% to 26% of Mn, 0.01% to 0.3% of Ti, 0.01% or less, excluding 0% of B, 4% or less, excluding 0% of Al, 1% to 6% of Cr, 0.05% or less, including 0% of P, 0.02% or less, including 0% of S, 0.01% or less, excluding 0% of N, 0.01% to 2% of Cu, 0.001% to 0.015% of Nb, and a remainder of Fe and other inevitable impurities, the alloy elements satisfying the following relational formula:
heating the steel slab at a temperature of 1000° C. to 1250° C.;

$$70<[10*(C/12)+(Mn/55)+(Al/27)]*100<95 \quad \text{[Relational Formula 1]}$$

$$4<100*(Cr/52+100*(Nb/93))<9, \quad \text{[Relational Formula 2]}$$

obtaining a hot-rolled steel plate by first hot rolling under conditions of a finish rolling temperature of 950° C. to 1050° C. and a reduction ratio of 10% or more per pass in recrystallization region and second hot rolling under conditions of a finish rolling temperature of 850° C. to 1000° C. and a reduction ratio of 2% or less, including 0% per non-recrystallization region; and
water cooling the hot-rolled steel plate at a cooling rate of 5° C./s or more to a cooling temperature of 250° C. to 600° C. and then coiling; thereby producing the hot-rolled steel plate of claim 1.

5. The method of manufacturing the hot-rolled steel plate of claim 4, wherein the hot-rolled steel plate comprises 97 area % or more, including 100% of austenite and 3 area % or less, including 0% of a carbide,
wherein the austenite has a grain size of 18 um to 30 um and the carbide has a grain size of 0.5 um or less.

6. The method of manufacturing the hot-rolled steel plate of claim 4, wherein the hot-rolled steel plate has an impact toughness value of 60 J or higher, measured by a charpy impact test at −196° C., yield strength of 320 MPa at a room temperature and uniform elongation of 50% or more at a room temperature.

7. The method of manufacturing the hot-rolled steel plate of claim 4, wherein the hot-rolled steel plate has inclusions that the number of inclusions having a 10 μm or greater is 300 or less per 10050 mm'.

8. The method of manufacturing the hot-rolled steel plate of claim 4, wherein the hot-rolled steel plate comprises the austenite, as the microstructure, in a fraction of 97 area % or more, including 100% at −196° C.

* * * * *